MASS-TRANSFER DEVICE AND METHOD OF MAKING SAME
Filed June 4, 1971 2 Sheets-Sheet 1
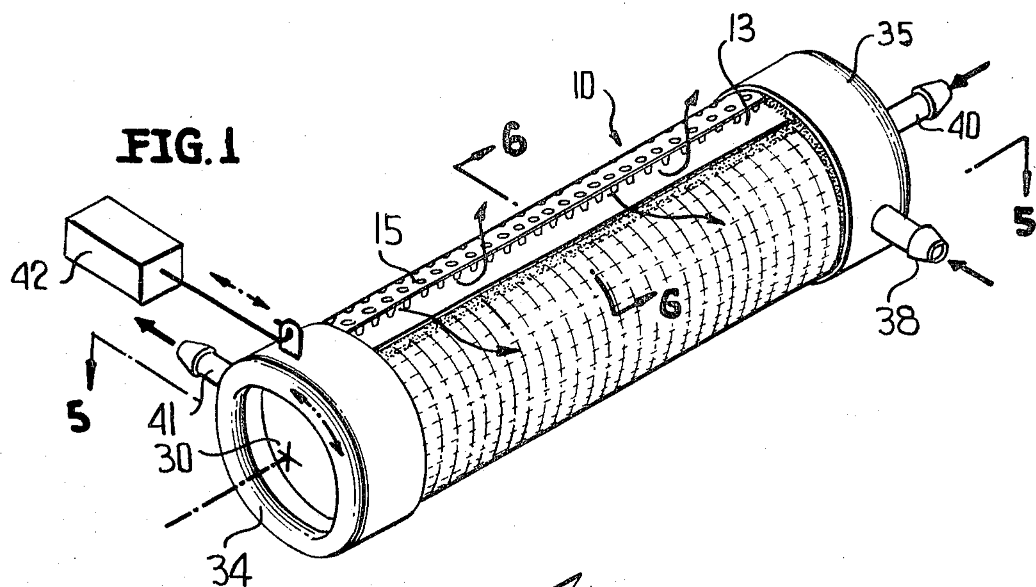
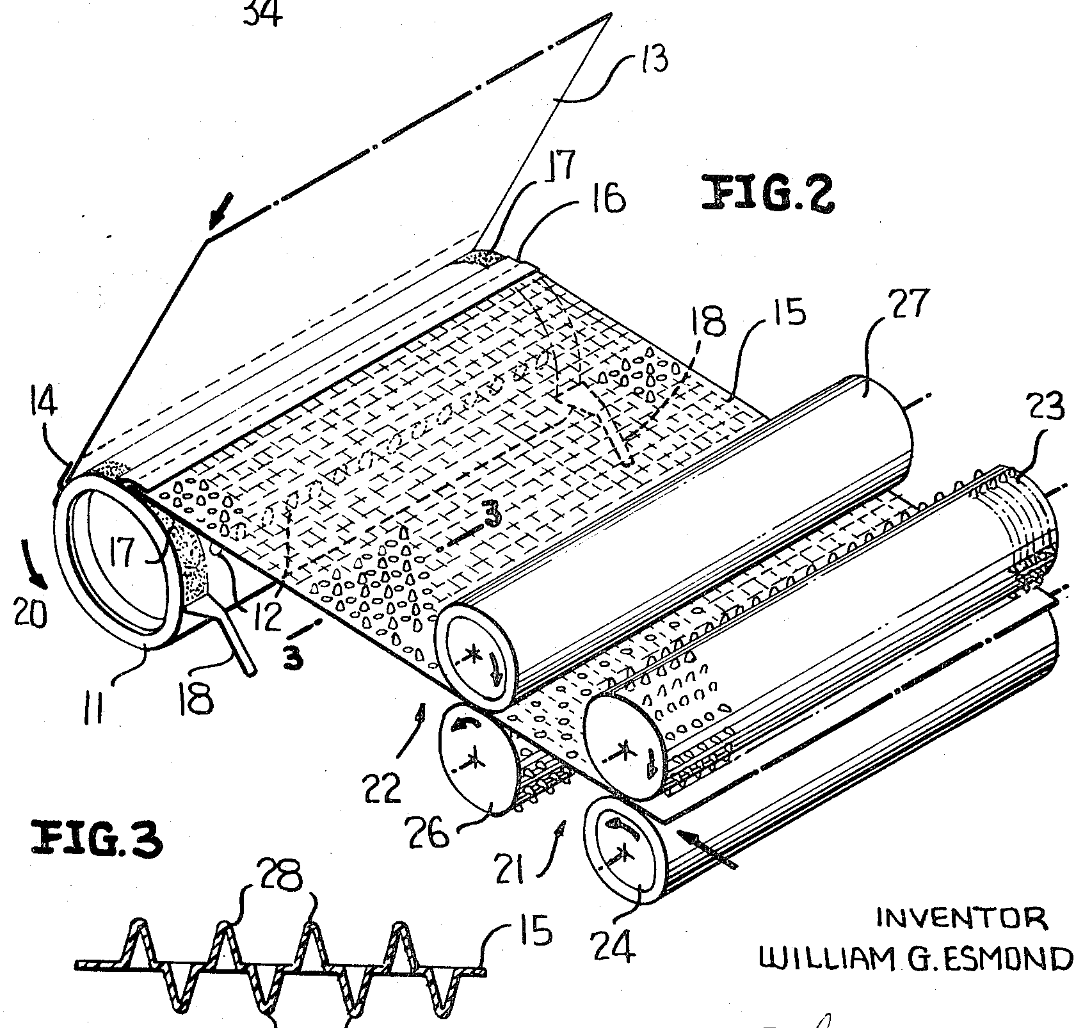
INVENTOR
WILLIAM G. ESMOND
By Chas R. Allen
ATTORNEY MASS-TRANSFER DEVICE AND METHOD OF MAKING SAME
Filed June 4, 1971 2 Sheets-Sheet 2
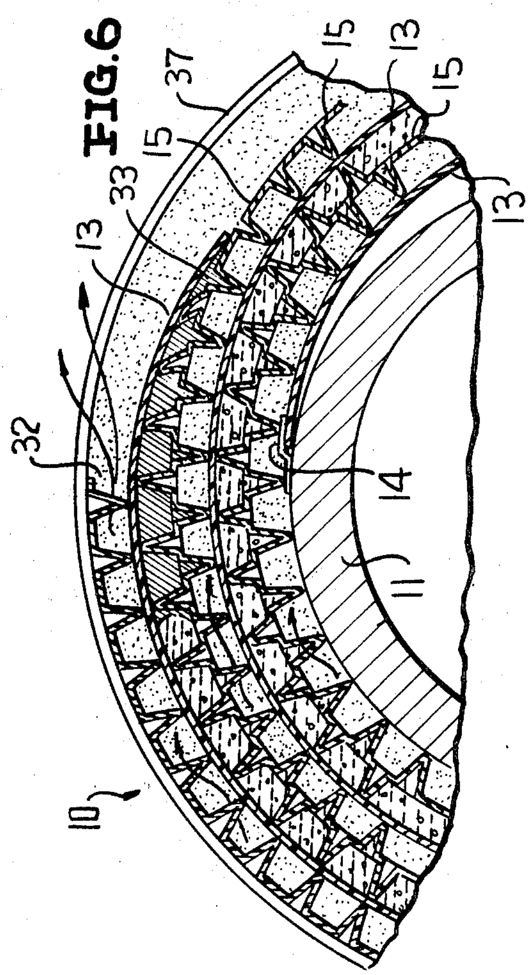
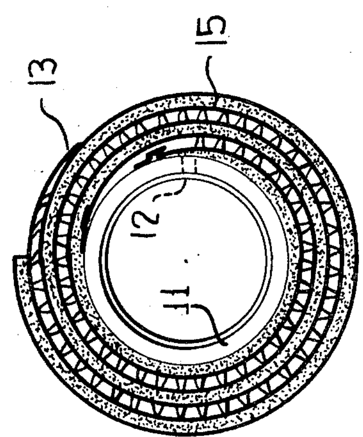
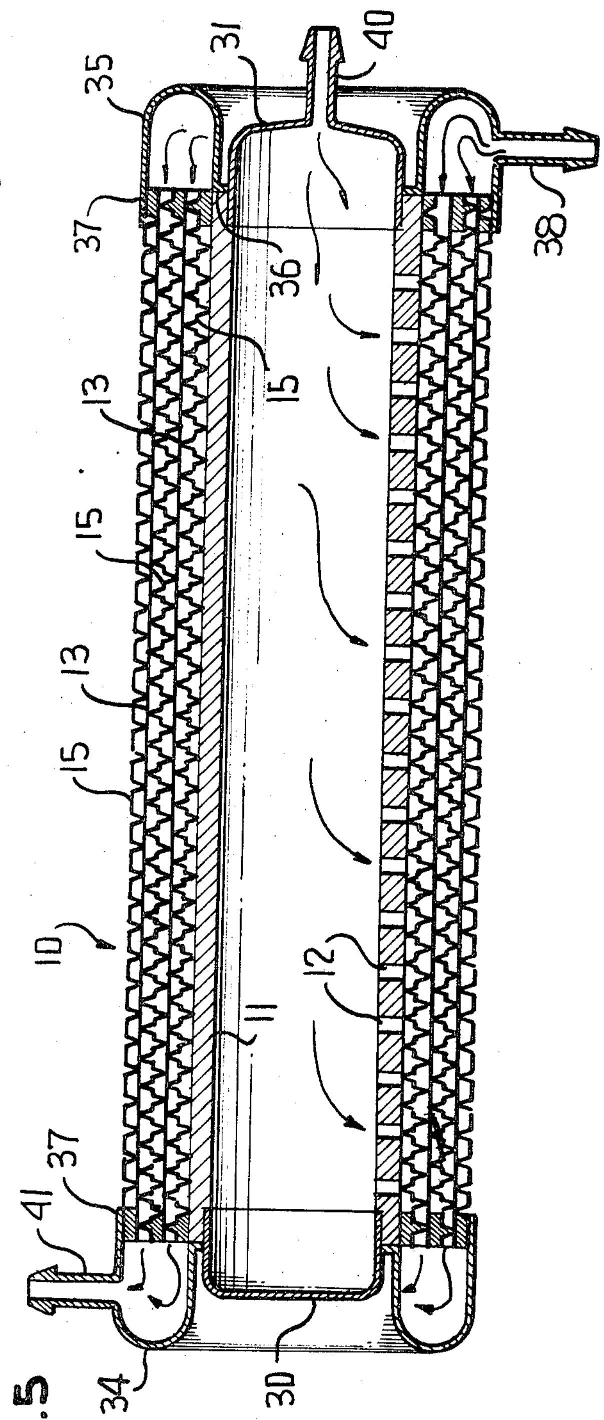
FIG.5
INVENTOR
WILLIAM G. ESMOND
By [signature]
ATTORNEY United States Patent Office 3,738,813
Patented June 12, 1973

3,738,813

MASS-TRANSFER DEVICE AND METHOD OF MAKING SAME

William G. Esmond, 537 Stamford Road, Baltimore, Md. 21229

Filed June 4, 1971, Ser. No. 149,951
Int. Cl. A61m *1/03*
U.S. Cl. 23—258.5 10 Claims

ABSTRACT OF THE DISCLOSURE

A transfer device which is particularly useable as a device for oxygenating blood. The device simply consists of a tubular support form about which an embossed film and a plain film are wrapped or coiled while suitably sealed together after which flow members in the form of end caps are applied. The transfer device is formed in a simple wrapping operation and the embossed film may be embossed imediately in advance of the wrapping operation.

This invention relates in general to new and useful improvements in exchange devices, and more particularly to an exchange device which may be utilized to medical purposes, such as for oxygenating blood.

BACKGROUND OF THE INVENTION

In the recent past many exchange devices have been developed for medical purposes, such as artificial kidneys, artificial lungs, etc. The cost of such devices to date is prohibitive. For the most part, the exchange devices have been in the form of plates with separating membranes. Such plates are too expensive not to be reused and are extremely difficult to cleanse and sterilize. However, such exchange devices are the better of exchange devices developed as of this time for medical uses, such as an artificial kidney or an artificial lung.

SUMMARY OF THE INVENTION

In accordance with this invention, a simple, easily formed and relatively inexpensive gas transfer device may be formed for use for oxygenating blood.

In accordance with this invention, a first web is passed through suitable embossing dies or rolls so as to emboss projections on opposite surfaces of this first film. A second and plain film has the leading edge thereof bonded to a cylindrical coil form in sealed relation, and thereafter, the leading edge of the embossed film is bonded to the coil form in sealed relation. Then, adhesive is continuously applied at the opposite ends of the coil form as the coil form is rotated so as to wind or coil the two films about the coil form until the necessary amount of passages are formed. Thereafter, the films are severed and the ends are properly secured.

The resultant coil form and wound film arrangement provides for a continuous circumferential passages between adjacent layers of the films and a plurality of generally circular axial passages between others of the layers of the films with the circumferential passage and the axial passages being separated by a single film in each instance. The coil form is perforated so that a first fluid flowing into the interior of the coil form will flow circumferentially out between the films.

A second fluid, such as blood, is flowed axially through the films by supplying the wound film in coil form with a pair of end caps which function as an inlet and an outlet.

With the above and other objects in view that will hereinafter appear, the nature of the invention will be more clearly understood by reference to the following detailed description, the appended claims and the several views illustrated in the accompanying drawings:

In the drawings:

FIG. 1 is a perspective view of the transfer device in accordance with this invention.

FIG. 2 is a perspective view showing the manner in which the transfer device is formed.

FIG. 3 is an enlarged fragmentary sectional view taken through the embossed film and shows the specific arrangement of the projections thereof.

FIG. 4 is an end elevational view of the coil film and the wound films.

FIG. 5 is an enlarged longitudinal sectional view taken along the line 5—5 of FIG. 1 and shows specifically the construction of the transfer device.

FIG. 6 is an enlarged fragmentary transverse sectional view taken along the line 6—6 of FIG. 1 and shows further the details of the transfer device.

In accordance with this invention, a transfer device, generally identified by the numeral 10, is formed by first providing an elongated cylindrical coil form 11 which has at least one line of perforations 12 formed therethrough.

With particular reference to FIG. 2, a plain film 13, which is the gas transfer film and is preferably formed of one mil thick silicon-polycarbonate copolymer membrane or three mil thick plain silicon rubber film, has the leading edge thereof secured to the coil form 11 in sealed relation. This is accomplished by means of a strip of tape 14 and by the application of any suitable cement.

Next an embossed film 15, which will be described hereinafter, is applied to the coil form 11 in sealed relation at a point intermediate the leading edge of the film 13 and the apertures 12. The embossed film 15 is also secured in place at least in part by means of a tape 16 and may otherwise be secured in sealed relation to the coil form by the application of suitable cement.

Bands of adhesive 17 are applied to the end portions of the coil form 11, starting at the leading edge of the film 13, by means of adhesive guns 18.

As a result of the application of the adhesive 17, the opposite edges of the first portion of the film 13 are sealed relative to the coil form. Also, the leading portion of the film 15 has the opposite edges thereof sealed with respect to the coil form 11.

Further rotation of the coil form 11 and the winding of the films 13 and 15 thereon will result in the application of the adhesive 17 in overlying relation to the exposed surface of the film 13 with the result that the inner surface of the film 15 will be sealed to the outer surface of the film 13 continuously along the edges of these two films.

It is to be understood that the winding of the films 13 and 15 on the coil form 11 may be accomplished automatically by rotating the coil form 11 in any suitable manner in the direction of the arrow 20. Also, in any conventional manner, the operation of the adhesive guns 18 may be geared with respect to the rotation of the coil form 11.

As is clearly shown in FIG. 2, the film 15 may be embossed immediately in advance of the winding thereof on the coil form 11. Embossing of the film 15 is accomplished by a first set 21 and a second set 22 of rollers. The roller set 21 includes an upper embossing roller 23 and a lower resilient back up roller 24. The rollers 23 and 24 cooperate to form projections 25 extending from the underside of the film 15, as is shown in FIG. 3.

The roller set 22 includes a lower embossing roller 26 and an upper resilient back up roller 27 which cooperate to form projections 28 extending upwardly from the film 15, as is shown in FIG. 3.

At this time it is pointed out that the film 15 can be made up of many types of plastics, but typically may be five mil to ten mil thick Lexan polycarbonate film. It is also preferred that the projections 25 and 28 be in the form of cones. Furthemore, it is preferred that the cement 17 utilized be in the form of a commercial cement which is identified as Silicon RTV cement.

Referring now to FIG. 5, it is to be noted that one end of the coil form 11 is closed by means of a plug 30 while the other end of the coil form is closed by means of a plug 31 which is in the form of an inlet fitting for a suitable transfer fluid which, in the case of the use of the transfer fluid as an oxygenator for blood would be oxygen. The oxygen will flow radially out through the apertures 12 into the space between the inner surface of the film 15 and the outer surface of the film 13 and will flow circumferentially between the windings of the films 13 and 15 about the coil form 11 until it exits between the free ends of the films 13 and 15 as at 32 in FIG. 6. At this time it is pointed out that the outer end of the film 13 is bonded to the outer surface of the film 15 by means of a suitable adhesive 33 which is best shown in FIG. 6.

A pair of end caps 34 and 35 are secured to the opposite ends of the coil form 11 in the manner best shown in FIG. 5. It is to be noted that each of the end caps 34 and 35 is of an annular outline and is generally U-shaped in cross section. Each end cap 34, 35 is provided with a mounting flange 36 which is secured to the respective end of the coil form 11. The outer part of each of the caps 34 and 35 includes an extension 37 which overlaps the wound films 13 and 15 and which is suitably bonded to the outer surface of the films by the suitable application of adhesive or other securing means.

The end cap 35 may be considered the inlet fitting and is provided with a suitable attachment 38 for the connection of a hose, which attachment 38 is similar to an attachment 40 of the plug 31. The end cap 34 is to be considered the outlet fitting and it is provided with a suitable fitting 41 which is also constructed for the attachment of a hose or tubing.

It is to be understood that blood will flow into the inlet or cap 35 through the fitting 38, axially between the films 13 and 15, into the end cap 34 and out through the fitting 41. It is further to be understood that the axial flow between the films 13 and 15 is outwardly of the outer surface of the film 15 and inwardly of the inner surface of the film 13. Accordingly, the flow of the blood through the exchange device 10 is in crossing relation with respect to the circumferential flow of oxygen and wherein the flowing oxygen is separated from the flowing blood by the film 13 which has been previously defined as a gas transfer film.

As the oxygen and blood flow through the exchange device 10, oxygen will be supplied to the blood, and certain waste from the blood will be transferred to the oxygen with this waste, particularly carbon dioxide and water flowing out with the surplus oxygen as at 32.

At this time it is pointed out that the exchange device 10 may be stationary when in use. On the other hand, it may be desirable to mount the exchange device 10 for rocking movement about the axis of the coil form 11 in any desired manner (not shown). As is clearly shown in FIG. 1, a shaker 42 is suitably secured to the exchange device 10, such as being coupled to the end cap 34, for the purpose of rapidly oscillating the exchange device 10 about its axis through an angle bearing from 90° to 180°. This kinetic shaking of the exchange device 10 will produce blood film turbulence in the basically laminar flow device, thereby providing for better flow efficiency.

It will be readily apparent that the method of construction offers economy and efficiency. One of the economy features is that practically every square centimeter of the highly expensive silicon membrane is utilized without wasteful trimming. The device is further extremely efficient since the blood film thickness can be held to the thinnest possible consistent with a reasonable pressure drop. The exchange device has a very low pressure drop because it is essentially a multiple parallel path device and only the gas flows in series. Since the gas (oxygen) has a much lower viscosity, this is no drawback.

Although only a preferred embodiment of the invention has been specifically illustrated and described herein, it is to be understood that minor variations may be made in the exchange device, the method of forming the same and the utilization thereof without departing from the spirit and scope of the invention, as defined by the append claims.

I claim:

1. A mass-transfer exchange device comprising a hollow tube having at least one generally axial row of perforations, closure means closing opposite ends of said tube, one of said closure means including an inlet fitting, an embossed impervious first web having projections on opposite surfaces thereof, means securing a transverse end edge of said first web to said tube along a line axially of said tube with a portion of said first web being directly wound on said tube in overlying communication with said perforations and having longitudinal edge portions of one surface thereof directly sealed to said tube, a generally planar semi-permeable second web formed of a film having gas transfer capabilities but being impervious to liquid flow therethrough, means securing a transverse end edge of said second web to said tube with a portion of said second web being directly wound on said tube and having longitudinal edge portions thereof sealed to said tube, the remaining portions of said webs being wound on said tube in alternating relation, means sealing the remaining longitudinal edge portions of said one surface directly to said second web to form a first spiral flow passage in communication with said perforations and a second spiral flow passage having openings generally at opposite ends of said tube, and end caps on opposite ends of said tube, each end cap being annular in outline and of a generally channel cross section including two radially spaced legs, one leg of each end cap being sealed to a respective end of said tube and the other leg being sealed to radially outermost longitudinal edge portions of said first and second webs with said second flow passage being in communication with interiors of said end caps for flow between said end caps axially of said tube, one of said end caps having an inlet fitting and the other of said end caps having an outlet fitting.

2. The exchange device of claim 1 together with means for rapidly oscillating said tube and webs about the axis of said tube to produce turbulence in the fluids flowing in said passages.

3. The exchange device of claim 1 wherein said tube and said first flow passage are particularly adapted for gaseous flow, means sealing an outer transverse end edge of said second web to said first web to form an outer sealing of said second passage, and said first passage opening to the exterior of said webs and forming an elongated outlet for said first passage extending generally axially of said tube between said end caps.

4. The exchange device of claim 1 wherein said end cap inlet and outlet fittings extend radially therefrom to provide for generally circumferential flow within said end caps.

5. A method of forming a mass-transfer exchange device comprising the steps of providing a hollow core having axially spaced perforations formed therein, providing an impervious first web, embossing said first web to provide projections on opposite surfaces thereof, securing a leading end of said embossed web to said core in circumferentially spaced relation to said perforations with the spacing being in a predetermined circumferential direction, securing a leading end of a semi-permeable second web to said core spaced in said predetermined direction from the leading end of said first web and between said first web leading edge and said perforations, said second web being formed of a film having gas-transfer capabilities but being impervious to liquid flow therethrough, and then rotating said core in said predetermined circumferential direction and winding said webs on said core in alternating layers with said first web directly overlying said perforations.

6. The method of claim 5 wherein said first web is initially planar and is progressively embossed as said first web is wound on said core.

7. The method of claim 5 wherein said first web is initially planar and is progressively embossed as said first web is wound on said core with first one surface and then the other surface of said first web being embossed in progression.

8. The method of claim 5 wherein said first web is initially planar and is progressively embossed as said first web is wound on said core with first one surface and then the other surface of said first web being embossed in progression, and in transversely and longitudinally staggered relation.

9. The method of claim 5 wherein a layer of adhesive is applied to one surface of one of said webs along opposite edges thereof to seal one surface of each layer of one web to an adjacent layer of the other web, said adhesive being applied to a portion of said one web after and as said one web portion is being wound on said core.

10. The method of claim 9 wherein said second web is planar and is said one web.

References Cited

UNITED STATES PATENTS

| | | | |
|---|---|---|---|
| Re. 26,097 | 10/1966 | Michaels | 210—321 |
| 2,599,604 | 6/1952 | Bauer et al. | 210—494 |
| 3,077,268 | 2/1963 | Gobel et al. | 210—494 X |
| 3,212,499 | 10/1965 | Koreski | 23—258.5 |
| 3,386,583 | 6/1968 | Merten | 210—494 X |
| 3,401,798 | 9/1968 | Nyrop | 210—494 X |
| 3,489,647 | 1/1970 | Kolobow | 23—285.5 X |
| 3,490,523 | 1/1970 | Esmond | 23—258.5 X |
| 3,508,662 | 4/1970 | Miller | 210—494 X |
| 3,510,004 | 5/1970 | Hoeltzenbein | 210—494 X |
| 3,554,378 | 1/1971 | Kohl | 210—321 |

BARRY S. RICHMAN, Primary Examiner

U.S. Cl. X.R.

55—158; 210—321, 494